(No Model.)

W. MILES.
TOASTER.

No. 338,097. Patented Mar. 16, 1886.

Witnesses
John Nelson
K. F. Steele

Inventor.
Walter Miles,
R. E. Nelson.
Atty.

UNITED STATES PATENT OFFICE.

WALTER MILES, OF CHILTON, WISCONSIN.

TOASTER.

SPECIFICATION forming part of Letters Patent No. 338,097, dated March 16, 1886.

Application filed July 31, 1884. Serial No. 139,343. (No model.)

*To all whom it may concern:*

Be it known that I, WALTER MILES, a citizen of the United States of America, residing at Chilton, in the county of Calumet and State of Wisconsin, have invented certain new and useful Improvements in Toasters, of which the following is a specification, reference being had therein to the accompanying drawings.

My invention is a toaster, and embraces the following novel features: A longitudinally concavo-convex metallic reflector furnished with a counterbracing-handle, and a set of two or more projecting hangers hooking over its top edge and hanging against the inside or reflecting surface, all of which and their purposes are hereinafter more fully described, and illustrated by the accompanying drawings, in which like letters designate identical parts of my device in the different figures, respectively.

Figure 1:
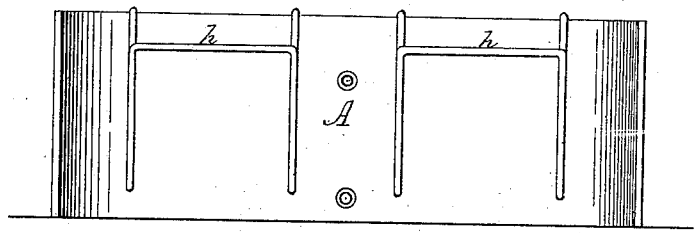
Figure 2:
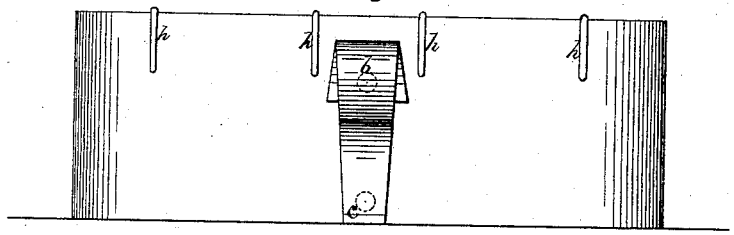
Figure 3:
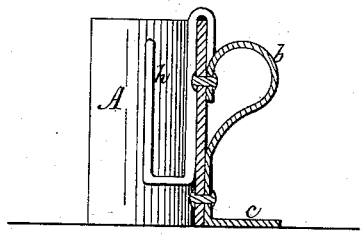

Figure 1 is an elevation of the front or concave side of the reflector, showing the horizontally-embowed ends of the same and the hangers hooked over its top edge and against said front. Fig. 2 is an elevation of the back or convex side of the reflector, showing the counterbracing-handle riveted to the same and the ends of the hanger-hooks reaching over and behind its top edge; and Fig. 3 is a transverse section of my device, showing it with its essential parts in proper position for use.

The letter A represents said reflector, which consists, preferably, of a smoothly-rolled and highly-polished metallic plate, rectangular in shape and evenly bowed at the ends into a concavo-convex form, as shown, this horizontally-bowed form being for the purpose and effecting the result of concentrating as well as reflecting the rays of heat, before the source of which the toaster with its hanging contents is placed. Upon the back or convex side of this reflector is vertically riveted a suitable and convenient handle, $b$, bent into the form of the figure 2, as shown, the horizontally-projecting foot or tail of which makes a fitting counter-brace, $c$, to keep the fender-like reflector steadily upright and from tilting backward when in use. The hangers $h$ are made of suitable wire, each from a piece of fitting length, bent from its middle portion into equal-sized pairs of rectangular double loops, forming together a projecting frame or holder in front of the concave side of the toaster, as shown, while hanging upon its top edge by the hook-bent ends of said piece of wire. These hangers make very simple yet complete and convenient holders in which to place the slices to be toasted, for while the slices are being properly toasted in front the reverse sides are also being browned by the reflected and radiated heat concentrating within the embowed ends of the reflector, thus accomplishing the desired result conveniently, quickly, and effectively.

For use the above-described toaster may be placed with equal effectiveness before any heating source most convenient—in an open fire-place, a grate, a stove, or a steady flame.

Therefore what I claim as new, and desire to secure by Letters Patent, is—

The embowed reflector having a handle with a counterbracing-foot, in combination with the counter-bent hooking and projecting hangers, substantially as and for the purposes herein specified.

In testimony whereof I affix my signature in presence of two witnesses.

WALTER MILES.

Witnesses:
J. E. McMULLEN,
J. C. KLEIST.